(12) United States Patent
Kmita et al.

(10) Patent No.: US 6,540,123 B1
(45) Date of Patent: Apr. 1, 2003

(54) PICKUP TRUCK BED EXTENDER APPARATUS

(75) Inventors: Gerard J. Kmita, Allen Park, MI (US); Jeffrey M. Aftanas, Ortonville, MI (US); Donald L. Muñoz, Bloomfield, MI (US); James W. Alexander, Birmingham, MI (US)

(73) Assignee: JAC Products, Inc., Saline, MI (US)

( * ) Notice: Subject to any disclaimer, the term of this patent is extended or adjusted under 35 U.S.C. 154(b) by 0 days.

(21) Appl. No.: 09/702,008

(22) Filed: Oct. 30, 2000

Related U.S. Application Data

(63) Continuation-in-part of application No. 09/429,613, filed on Oct. 29, 1999, now abandoned.

(51) Int. Cl.[7] ................................................. B60R 9/00
(52) U.S. Cl. ................. 224/403; 296/26.08; 296/26.11; 296/57.1
(58) Field of Search ................................ 224/402, 403, 224/404, 405; 296/26.01, 26.08, 26.11, 57.1, 37.6

(56) References Cited

U.S. PATENT DOCUMENTS

| | | |
|---|---|---|
| 797,900 A | 8/1905 | Lowry |
| 1,919,063 A | 7/1933 | Hubbard |
| 2,729,499 A | 1/1956 | Eggum |
| 2,852,303 A | 9/1958 | Hopson |
| 2,872,239 A | 2/1959 | Bowness et al. |
| 3,632,153 A | 1/1972 | Knudsen |
| 3,902,599 A | 9/1975 | Stromberg |
| 4,023,850 A | 5/1977 | Tillery |
| 4,136,905 A | 1/1979 | Morgan |
| 4,472,639 A | 9/1984 | Bianchi |
| 4,531,773 A | 7/1985 | Smith |
| 4,778,213 A | 10/1988 | Palmer |
| 4,824,158 A | 4/1989 | Peters et al. |
| 4,830,242 A | 5/1989 | Painter |
| 5,083,829 A | 1/1992 | Fonseca |
| 5,123,691 A | 6/1992 | Ginn |
| 5,147,103 A | 9/1992 | Ducote |
| 5,154,470 A * | 10/1992 | Bringman, Jr. |
| 5,201,562 A | 4/1993 | Dorsey |
| 5,253,913 A | 10/1993 | Metivier |
| 5,328,225 A | 7/1994 | Melching et al. |
| 5,788,311 A * | 8/1998 | Tibbals |
| 5,823,596 A * | 10/1998 | Kulesza |
| 5,997,066 A * | 12/1999 | Scott |
| 6,257,637 B1 * | 7/2001 | Reed |
| 6,338,515 B1 * | 1/2002 | Munhall |
| 6,340,190 B1 * | 1/2002 | Rosebrugh et al. |

* cited by examiner

Primary Examiner—Stephen K. Cronin
(74) Attorney, Agent, or Firm—Harness Dickey & Pierce P.L.C.

(57) ABSTRACT

A bed extender apparatus adapted for use with a pickup truck bed to functionally enlarge the useable cargo area within the truck bed when a tailgate is in a lowered position. The bed extender includes a center wall which is pivotably mounted to an inner surface of the tailgate, and which can be pivoted into an upright position once the tailgate is moved into a lowered position. A pair of end walls are pivotably secured to opposite ends of the center wall. Each end wall can be pivoted out to a position extending perpendicular to the center wall once the center wall is in its raised or operative position. Each of the end walls can then be secured to an associated one of the vertical walls of the pickup truck bed. A principal advantage of the bed extender is that the end walls and center wall each include a plurality of members which, when the end walls are folded against the center wall, form an extremely compact arrangement which takes up virtually no appreciable cargo space within the pickup truck bed. The bed extender also forms an extremely aerodynamically efficient structure when in use.

15 Claims, 13 Drawing Sheets

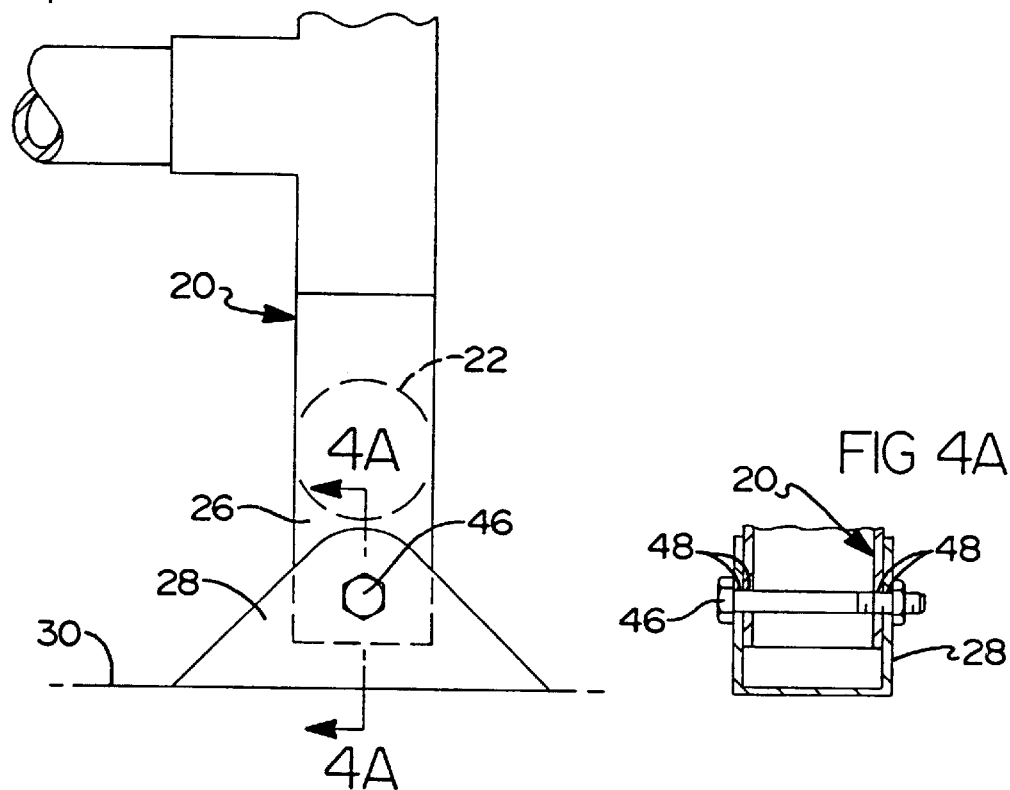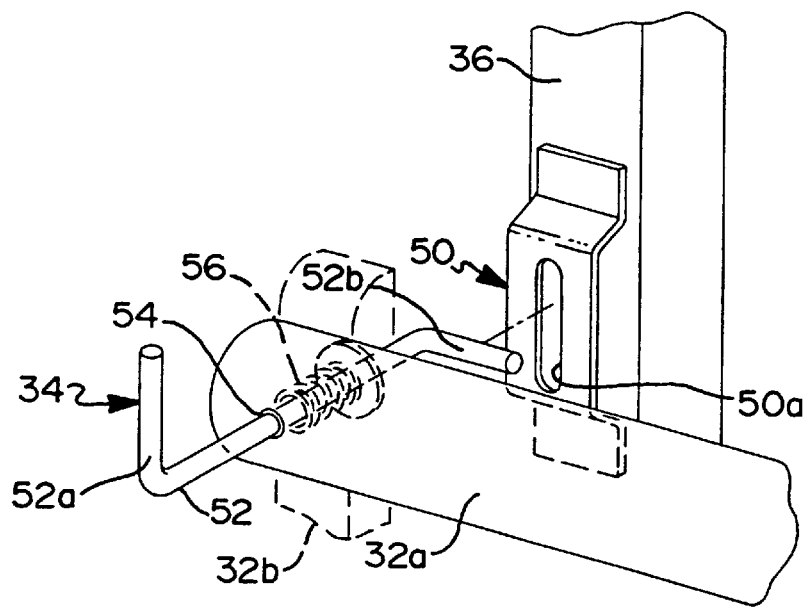

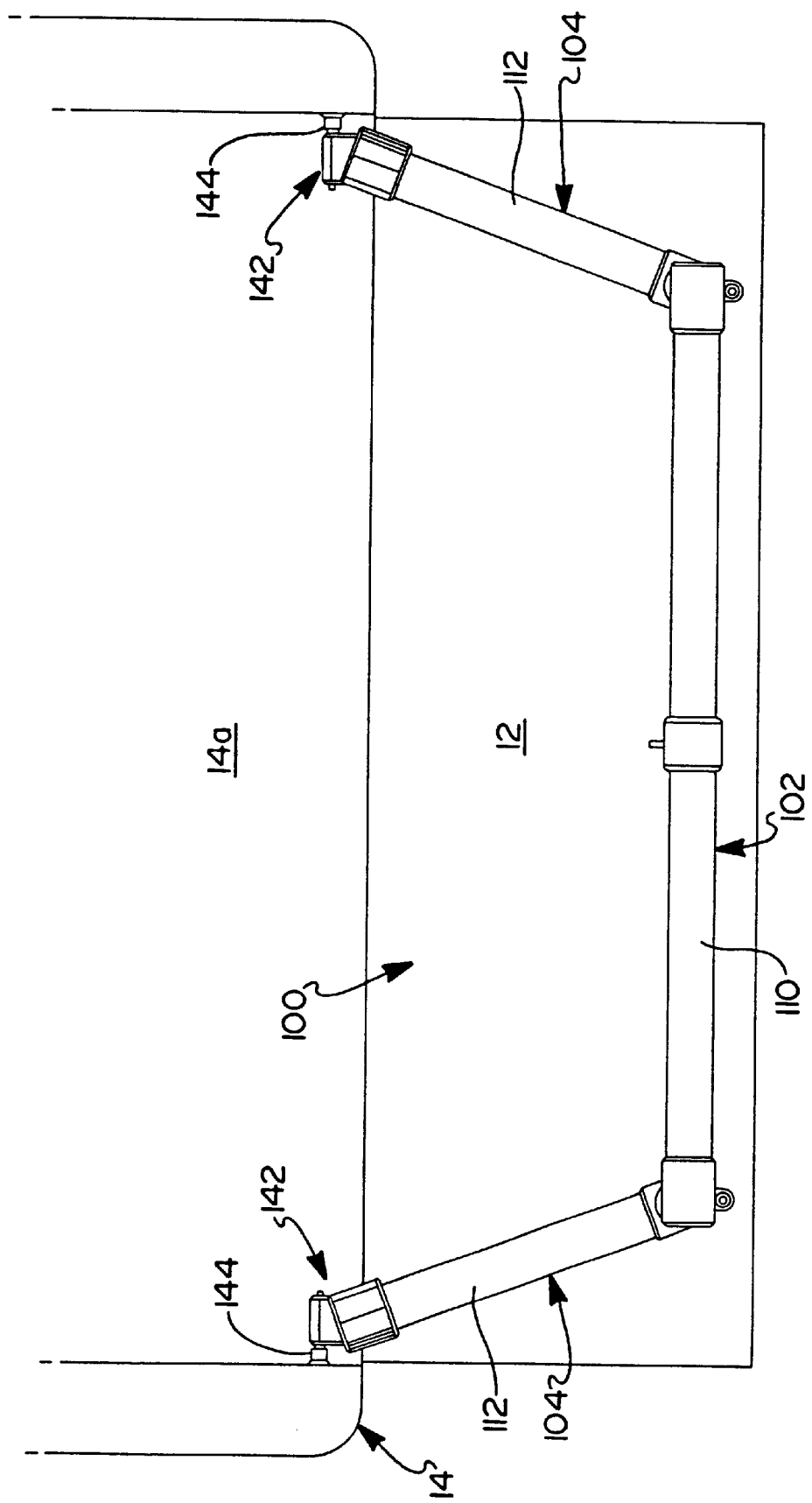

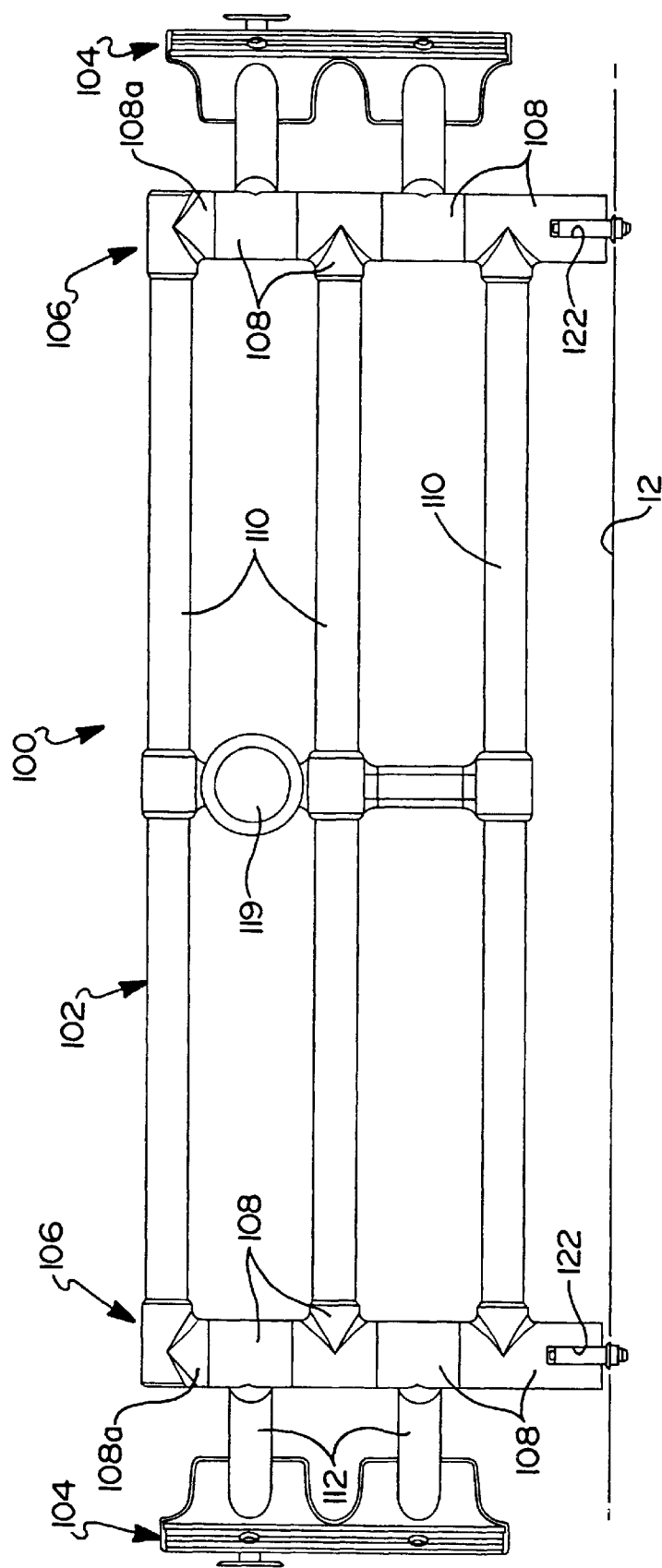

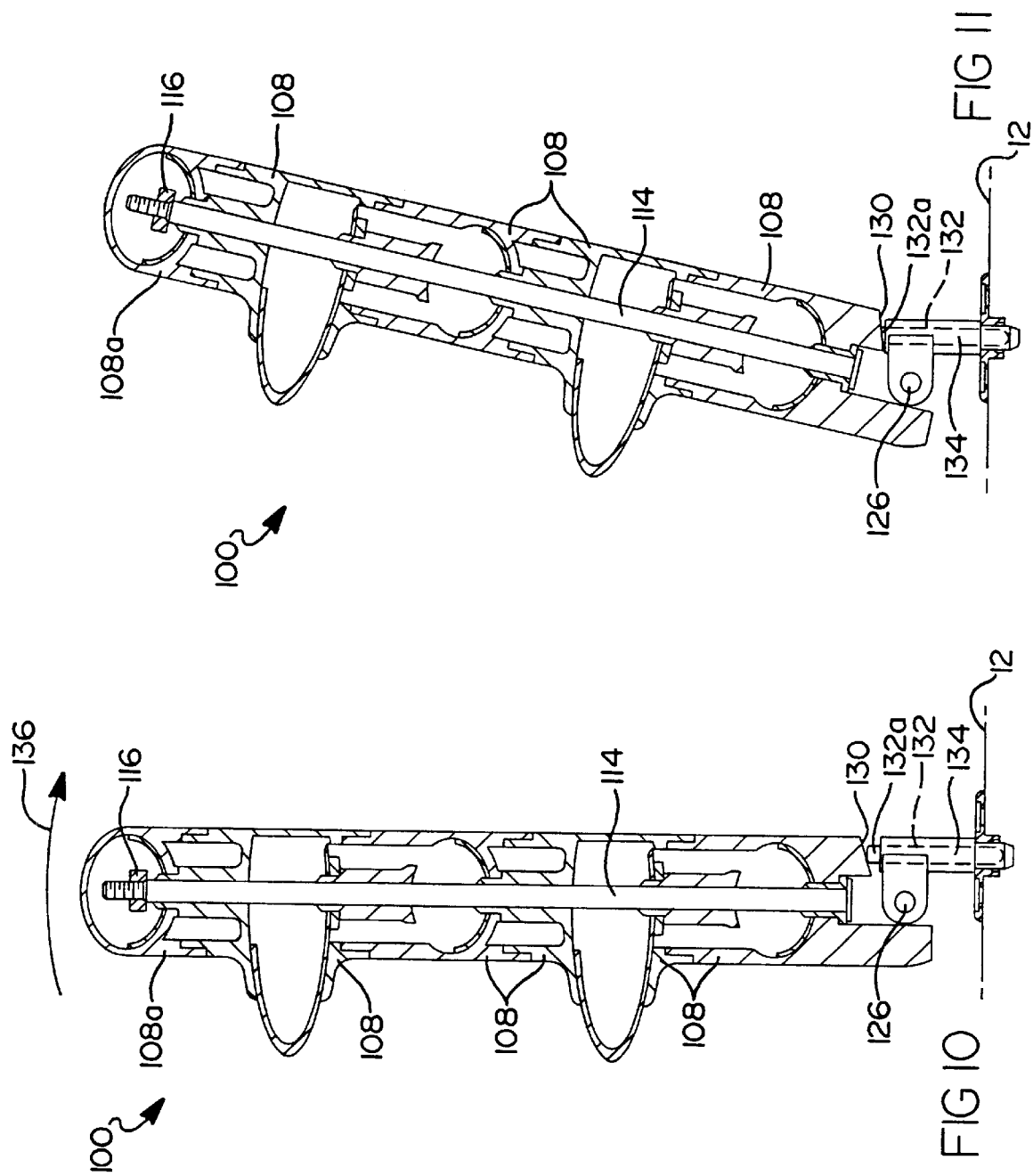

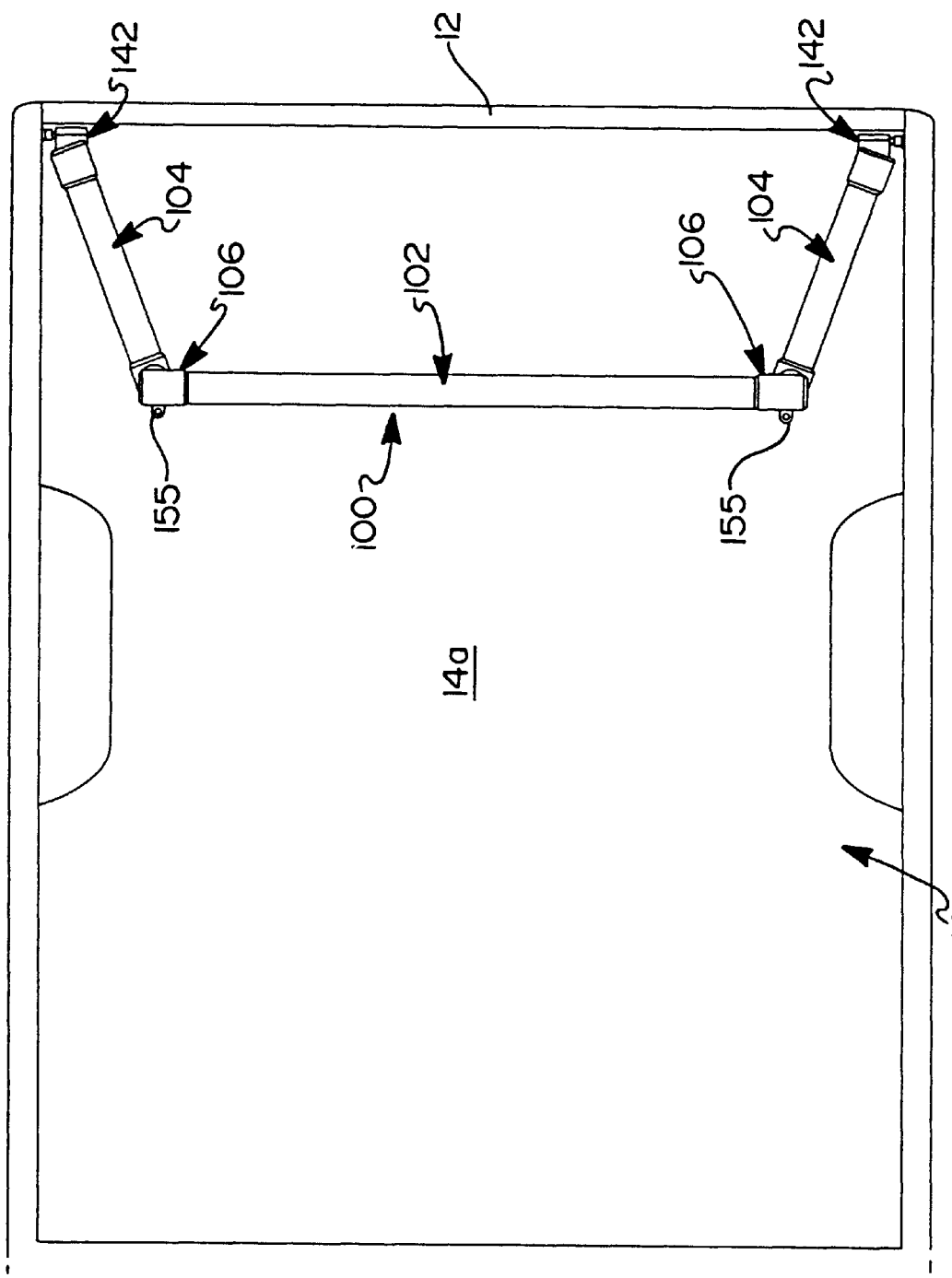

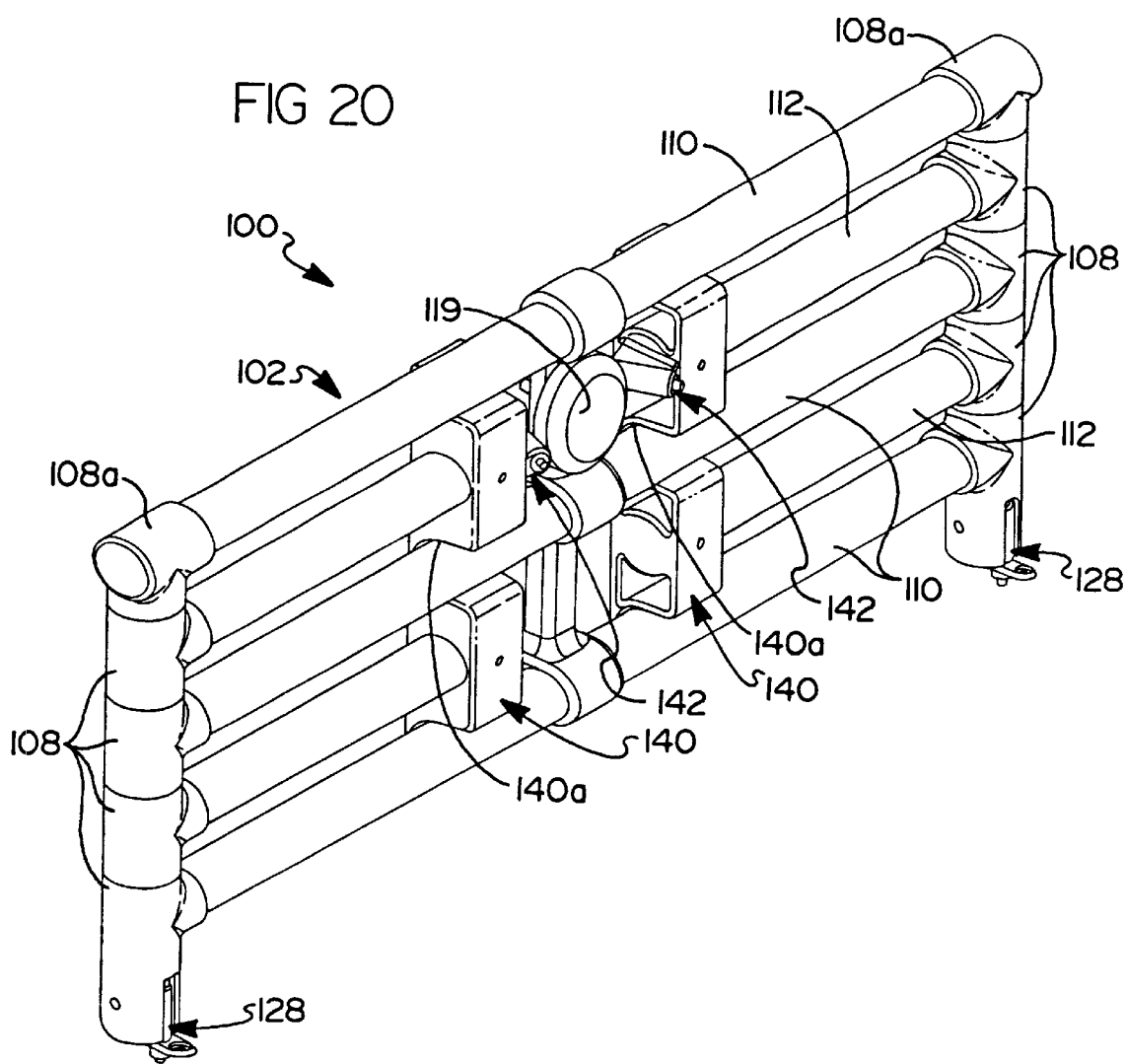
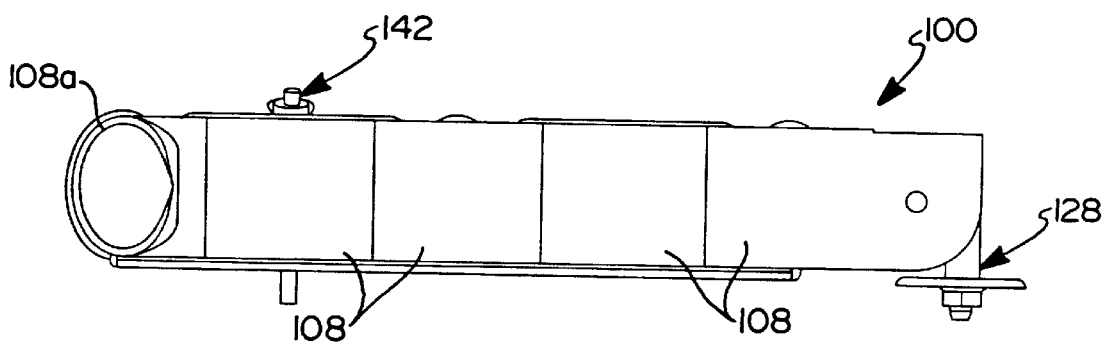

PICKUP TRUCK BED EXTENDER APPARATUS

CROSS REFERENCE TO RELATED APPLICATION

This application is a continuation-in-part of U.S. patent application Ser. No. 09/429,613, filed on Oct. 29, 1999, and presently abandoned.

TECHNICAL FIELD

This invention relates to devices adapted to be used in connection with a bed of a pickup truck to enhance the cargo carrying capacity of the pickup truck bed, and more particularly to a bed extender apparatus which is adapted to be foldably extended into position to form a three sided upright structure over the tailgate of a pickup truck bed to thereby functionally extend the useable area of the bed when the tailgate is in its lowered position.

BACKGROUND OF THE INVENTION

DISCUSSION

Various devices have been developed in an attempt to extend the useable space within a bed of a pickup truck. Such attempts are illustrated and described in the following U.S. Pat. Nos. 797,900; 2,872,239; 4,023,850; 4,136,905; 4,472,639; 4,513,773; 4,778,213; 4,824,158; 4,830,242; 5,154,470; 5,328,225; 5,700,047; 5,775,759.

The devices illustrated and described in the above-referenced patents suffer from a variety of drawbacks. Certain of the devices disclosed are relatively complicated and expensive to construct. Others interfere with placement of cargo in a pickup truck bed area when the device is not in use. Still other ones of the devices disclosed are not capable of being collapsed in an efficient, compact arrangement when the device is not in use.

Another drawback with present day bed extender devices is their inability to be quickly and easily removed from a truck bed when not needed or to be repositioned to perform a restraining function for holding smaller cargo items against movement in the bed while the vehicle is travelling. Thus, it would be desirable to provide a bed extender for a pickup truck which could be used in a first orientation to provide a bed extending function, and also used in a second orientation to provide a cargo restraining function in the truck bed.

It is still a further object of the present invention to provide a bed extender apparatus which can be quickly articulated into its operative position without the need for any external tools.

It is still another object of the present invention to provide a bed extender which is relatively inexpensive to produce and which can be secured to a tailgate of a pickup truck with little or no modifications to the-tailgate and/or to the pickup truck bed.

SUMMARY OF THE INVENTION

The above and other objects are provided by a bed extender apparatus in accordance with preferred embodiments of the present invention. The bed extender apparatus of the present invention is adapted to be secured to a tailgate of a pickup truck bed and quickly and easily articulated into its operative position after the tailgate is lowered. The bed extender apparatus further does not require any external tools to place it in its operative position or to collapse it from its operative position into a "storage" or fully retracted position.

In one preferred embodiment the bed extender apparatus comprises a center wall having a width substantially in accordance with the width of the tailgate on which it is to be installed. The center wall is formed by a pair of opposing uprights between which extend a plurality of generally linear, elongated members. Each of the uprights are adapted to be pivotably secured to an inner surface of the liftgate at an upper edge of the tailgate such that the entire center wall can be pivoted upwardly once the liftgate is moved into a lowered position.

Extending from each of the uprights is an end wall. Each end wall is formed from a plurality of generally linearly extending members. Each of the members have a first end and a second end. The first ends are operatively coupled to the uprights such that each end wall can be pivoted to a position extending generally perpendicularly from the center wall once the center wall is lifted into its operative position. Each end wall further has a locking mechanism associated therewith. Each locking mechanism is adapted to engage a suitable securing member mounted at or near the rearmost portion of the upright walls of the pickup truck bed.

It is a principal advantage of the bed extender apparatus of the present invention that the elongated members of the end walls are staggered and positioned relative to the members of the center wall such that when the end walls are retracted into the stored position they can be positioned in the open areas formed between adjacent ones of the members of the center wall. This allows the end walls to be stored within the plane formed by the members of the center wall but without interference from the center wall members. When in the stored position, the end walls and center wall form a very thin, compact assembly which rests against an inner surface of the tailgate.

When in the operative position, the bed extender apparatus of the present invention forms an extremely strong yet aerodynamically efficient structure which allows the useable space of the pickup truck bed to be functionally enlarged by forming a three-sided wall portion over the tailgate. Another important advantage of the bed extender apparatus is that it does not take up any significant cargo area within the pickup truck bed when it is in its stored position.

In an alternative preferred embodiment of the present invention a bed extender is disclosed which can be quickly and easily removed from a tailgate to which it is attached and reattached so as to form a cargo restraining area within the bed of a pickup truck. With this embodiment a first pair of mounting elements are fixedly disposed within the tailgate. A second pair of mounting elements are fixedly disposed at upper areas of sidewalls of the truck bed adjacent the tailgate. A third pair of mounting elements are fixedly disposed in the bed forwardly of the first pair. The bed extender is similar to the previous embodiments discussed in that a pair of uprights are formed by a plurality of T-shaped fittings secured together by rods which extend substantially the entire length of each upright. The T-shaped fittings are secured alternately to main supports which extend between the two uprights to form a center wall, and a plurality of end support members which form two separate endwalls. The main supports are spaced apart parallel to one another to form a plurality of open areas therebetween. The end support members can be pivoted down to rest inbetween, and flush with, the main supports.

A principal advantage with the alternative preferred embodiment described above is the inclusion of quick release mounting assemblies incorporated at the bottom of each upright, and a pair of quick release latching pins associated with the end walls. The quick release mounting assemblies engage with the first pair of mounting elements to maintain the center wall securely attached to the tailgate. Since the mounting assemblies and mounting pins can be quickly and easily manually released, the entire bed extender can be removed from the tailgate. The bed extender can then be rotated 180 degrees and the quick release mounting assemblies secured to the third pair of mounting elements. This positions the center wall within the area of the truck bed. The locking mechanisms of the end walls can then be secured to the second pair of mounting elements disposed on the sidewalls of the truck bed. When the tailgate is in a raised position, the bed extender thus forms a cargo restraining device for holding smaller articles in the bed against movement.

BRIEF DESCRIPTION OF THE DRAWINGS

The various advantages of the present invention will become apparent to one skilled in the art by reading the following specification and subjoined claims and by referencing the following drawings in which:

FIG. 4 is a side, fragmentary view of a portion of the center wall pivotably secured via a mounting bracket to an inner surface of the tailgate;

FIG. 4a is a cross sectional view taken in accordance with section line 4a–4a in FIG. 4 of the bracket member which secures an associated upright for pivotable movement; and FIG. 5 is a fragmentary, perspective view of a portion of the end wall illustrating more clearly the locking mechanism which secures the end wall to the vertical wall of the pickup truck bed.

FIG. 8 is a top view of the bed extender of FIG. 7;

FIG. 9 is a rear view of the bed extender of FIG. 7;

FIG. 10 is a partial cross-sectional side view of the bed extender showing the center wall in its fully raised position;

FIG. 11 is a view of the center wall shown in FIG. 10 after having been tilted rearwardly to unlock the locking pin from its mounting element;

FIG. 17 is a plan view of the truck bed with the bed extender mounted to pen rearwardly, thus forming a cargo restraining implement;

FIG. 20 is a perspective view of the bed extender in its folded position;

FIG. 21 is a side view of the bed extender in its folded position; and

DETAILED DESCRIPTION OF THE PREFERRED EMBODIMENTS

Figure 1:
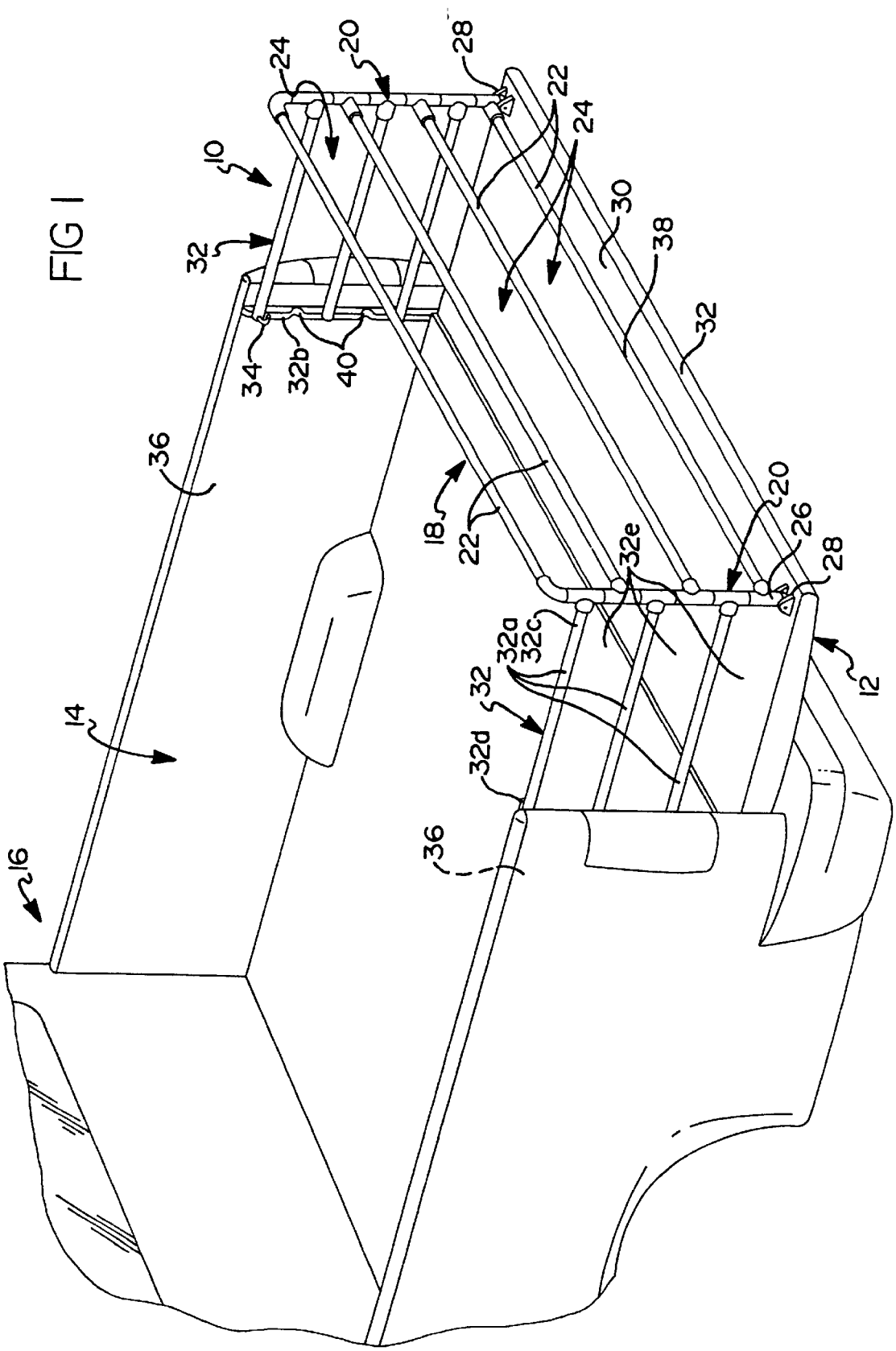
FIG. 1 is a perspective view of a bed extender apparatus in accordance with a preferred embodiment of the present invention secured to a pickup truck bed, showing the apparatus in its operative position.

Referring to FIG. 1, there is shown a pickup truck bed extender 10 in accordance with a preferred embodiment of the present invention. The bed extender 10 is shown secured to a tailgate 12 of a pickup truck bed 14 of a vehicle 16. The bed extender 10 generally comprises a center wall 18 and a pair of end walls 32. The center wall 18 has a pair of uprights 20 and a plurality of linear, elongated members 22 extending between the uprights 20. The members 22 are spaced apart so as to provide open areas 24 between adjacent ones of the members 22. Each upright 20 is secured at a first end 26 by a bracket member 28 which is fixedly secured to an inner surface 30 of the tailgate 12 near an upper edge 32 of the tailgate 12. The brackets 28 allow the uprights 2o to be pivoted between the position shown in FIG. 1 (i.e., the operative position) and the stored or retracted position shown in FIG. 2.

Pivotably secured to each upright 20 is one of the end walls 32. Each end wall 32 is formed by a plurality of elongated members 32a which are secured to a common end post 32b. The members 32a extend generally parallel to one another to form open areas 32e therebetween. The end wall 32 is secured at a first end 32c to an associated one of the uprights 20. A second end 32d thereof is secured via a locking mechanism 34 to an associated vertical wall 36 of the pickup truck bed 14. When in the operative position shown in FIG. 1, the bed extender 10 forms a strong yet very aerodynamically efficient means for functionally extending the useable interior area of the truck bed 14. The open areas 24 and 32e allow air to flow easily through the bed extender 10 thus significantly reducing the wind drag which would typically be produced by other forms of bed extenders.

Figure 2:
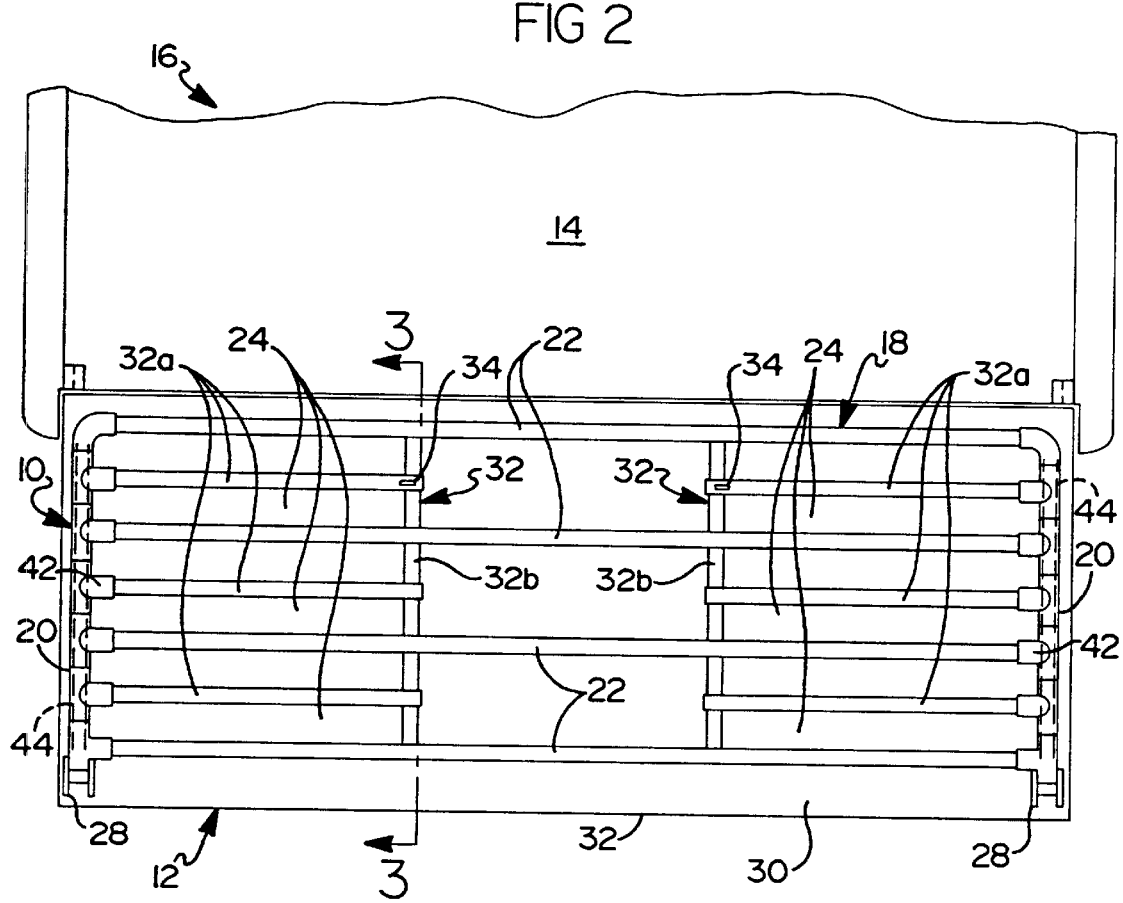
FIG. 2 is a plan view of the bed extender apparatus of FIG. 1.
Figure 3:
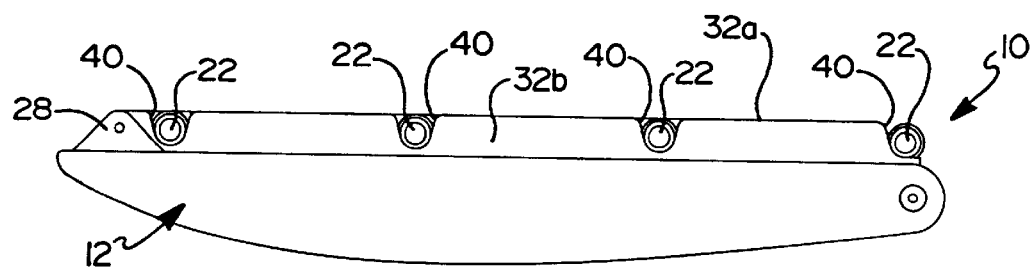
FIG. 3 is a cross sectional end view in accordance with section line 3—3 in FIG. 2 illustrating how compactly the members of each of the center wall and the end walls reside within a generally common plane when the bed extender is in its stored position.

Referring now to FIG. 2, the bed extender 10 is illustrated in its stored position. The members 32a of the end walls 32 fit within the open areas 24 between adjacent ones of the members 22. As such, the members 32a rest within the same plane as the members 22, as can be even better seen in FIG. 3. The members 22 rest in the recesses 40 of the support blocks 38 to help prevent vibration or rattling when the vehicle 16 is travelling over rough surfaces.

Each of the members 32a of the end walls 32 preferably are secured by T-shaped fittings 42 to a frame member 44 which extends through each of the fittings 42. Similarly, each member 22 is secured by identical T-shaped fittings 42 to the frame member 44. It will be appreciated, however, that any means which allows the members 32a to be pivoted relative to the center wall 18 may be used to couple the members 32a to the uprights 20. The members 32a and 22 may comprise lightweight, tubular metal components such as tubular aluminum or steel lengths which are lightweight and yet structurally strong. A strap 23 can be used to secure the center wall 18 against the tailgate 12.

Referring now to FIGS. 1 and 4 and 4a, a portion of one of the uprights 20 can be seen with the bracket member 28 shown in enlarged fashion coupling the upright 20 to the inner surface 30 of the tailgate 12. The bracket member 28 preferably forms a U-shaped component having a threaded bolt 46 or other like member which extends through openings 48 to pivotably secure the first end 26 of the upright 20 thereto. It will be appreciated, however, that a variety of differently shaped brackets could be employed, the only requirement being that the bracket allow easy pivoting movement of the upright 20 between its operative and stored positions. The bracket member 28 is preferably formed from metal or another suitably high strength material.

Referring now to FIG. 5, the locking mechanism 34 and an associated securing member 50 can be seen in greater detail. The locking mechanism 34 preferably comprises a curved locking member 52 which extends through an opening 54 in an end of one of the members 32*a*. The locking member 52 preferably includes two L-shaped ends, a portion 52*a* being adapted to be manually grasped by an individual, and portion 52*b* adapted to engage within an opening 50*a* of the securing member 50. A spring 56 is operably associated with the locking member 52 so as to bias portion 52*a* away from the member 32*a* once portion 52*b* is inserted within the opening 50*a* and rotated approximately 90° into the position shown in FIG. 5. Securing member 50 is preferably fixedly attached to the vertical wall portion 36 of the truck bed 14. Thus, to lock the end wall 32 associated with locking mechanism 34, the user pushes against portion 52*a* which causes portion 52*b* to enter the opening 50*a* and, while maintaining this pushing force, rotates portion 52*a* either clockwise or counterclockwise 90° before releasing the locking member 52.

Figure 6:
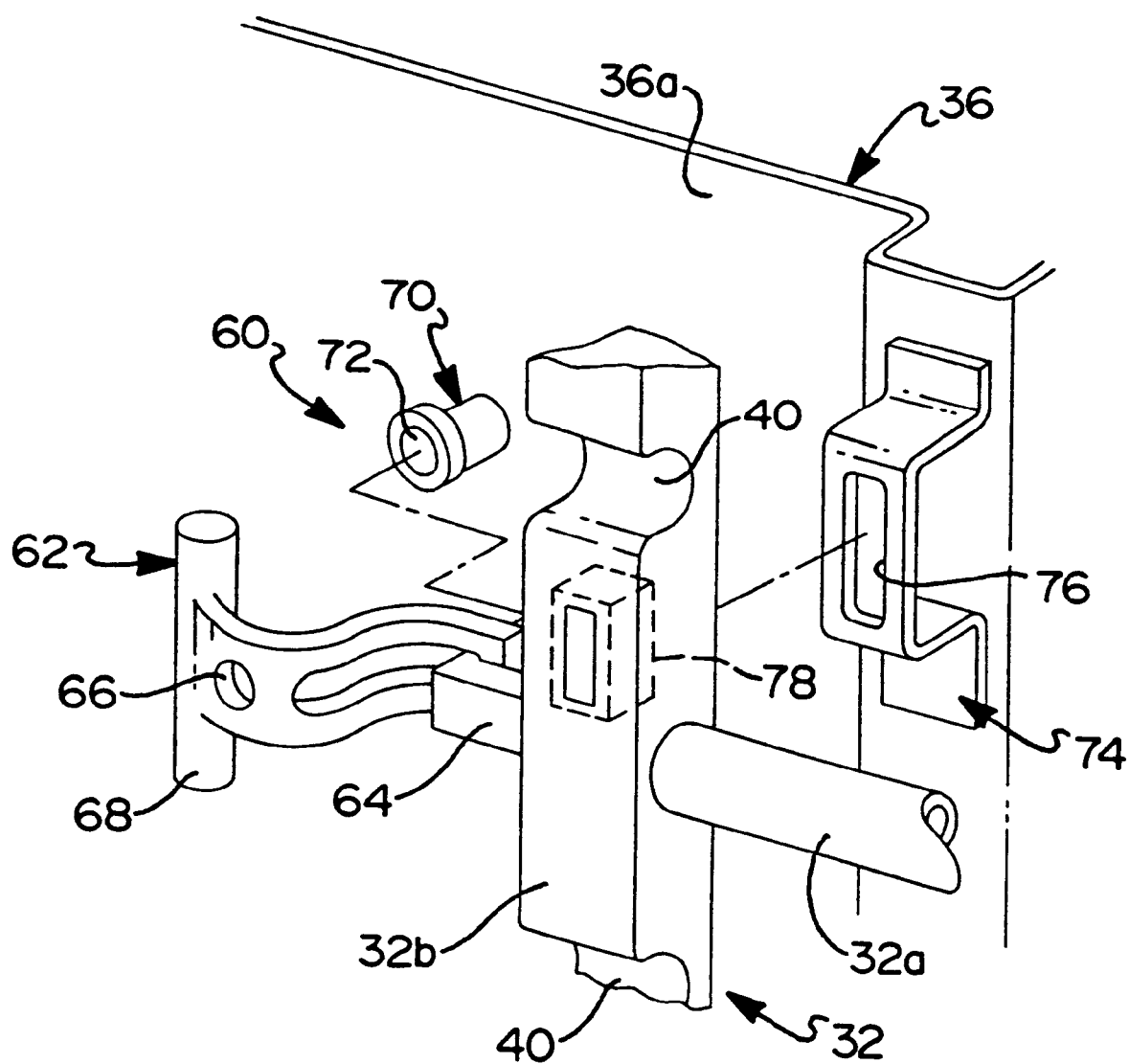
FIG. 6 is a perspective view of a portion of a locking mechanism in accordance with an alternative preferred embodiment of the present invention.

Referring to FIG. 6, an alternative preferred embodiment 60 of the locking mechanism 34 will be described. The locking mechanism 60, which is the more preferred locking arrangement at the present time, includes an elastic strap 62 which is captively secured by a U-shaped member 64 fastened to the end post 32*b*, such as by threaded screws (not shown). The strap 62 includes an opening 66 and a handle portion 68. The handle portion 68 can be grasped to stretch the strap 62. A securing post 70 is fixedly secured by a threaded screw 72 to the inside surface 36*a* of the vertical wall 36 of the truck bed 14. A U-shaped bracket 74 having an opening 76 is also fixedly secured to the inside surface 36*a* of the wall 36 of the truck bed 14.

The end post 32*b* is preferably molded from a suitably high strength plastic and includes a projecting portion 78. The end post 32*b* may further include a recessed area (not shown) immediately surrounding the projection portion 78.

The end wall 32 is secured to the bracket 74 by positioning the end post 32*b* such that the projecting portion 78 fits within the opening 76 in the bracket 74. The user than grasps the strap 62 by handle portion 68 pulls outwardly while urging the strap over the securing post 70. In this manner the end post 32*b* is held securely to the bracket 74.

To articulate the apparatus 10 from the position shown in FIG. 2 into the position shown in FIG. 1, the user first lifts the center wall 18 upwardly until it is approximately perpendicular to the upper surface 30 of the tailgate 12. The user then folds out each of the end walls 32 into the position shown in FIG. 1. The locking mechanism 34 associated with each end wall 32 can then be secured to its associated securing member 50. Collapsing of the bed extender 10 is performed in the opposite order just given.

The bed extender apparatus 10 thus forms a relatively low cost, easy to install and use apparatus for functionally enlarging the useable cargo area of a pickup truck bed. Importantly, when not in use, the bed extender 10 of the present invention forms an extremely compact assembly which does not take up any appreciable cargo area within a pickup truck bed. The apparatus is easy to construct, strong and yet light in weight and is extremely aerodynamically efficient when in use. The bed extender 10 forms an extremely slim, compact arrangement when not in use.

Figure 7:
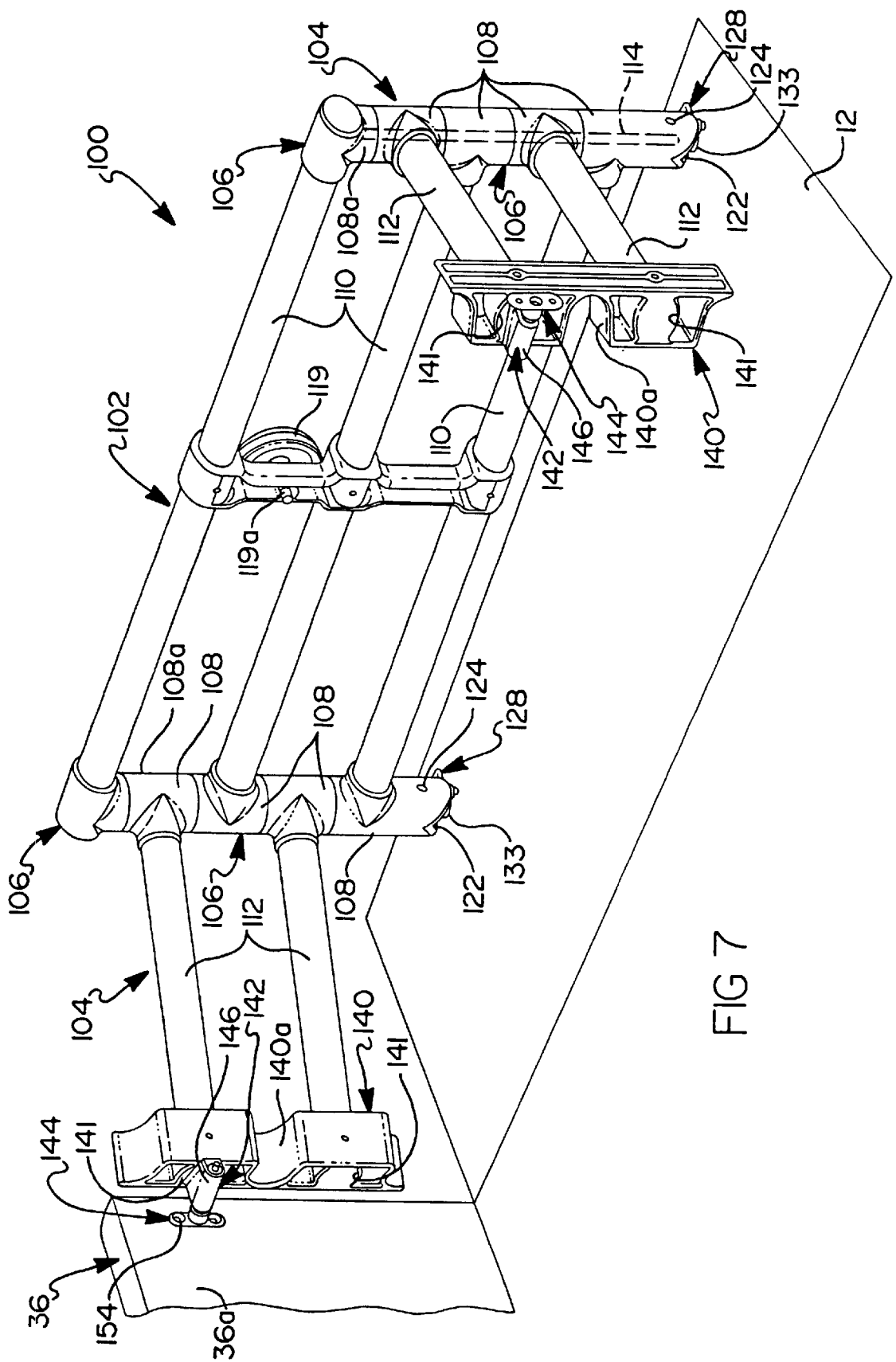
FIG. 7 is a perspective view of a bed extender in accordance with an alternative preferred embodiment of the present invention.

Referring now to FIGS. 7–9, a bed extender 100 is illustrated in accordance with an alternative preferred embodiment of the present invention. The bed extender 100 is similar to the bed extender 10 in that it includes a center wall 102 and a pair of end walls 104. The center wall 102 includes a pair of uprights 106 at its outermost ends which are formed by a plurality of tubular, T-shaped fittings 108 and 108*a*. Alternating ones of the fittings 108 are coupled to main supports 110 and to end wall support members 112. The main supports 110 and end wall support members 112 are each preferably formed by tubular lengths of strong yet lightweight material, such as aluminum, or any other suitably strong and lightweight material. As shown in FIG. 10, a rod 114 runs through each of the T-shaped fittings 108 and is threadably secured to a terminal fastening element 116.

The center wall 102 includes a manually graspable hold down element 119 having a threaded shaft 119*a* that can be engaged with a rivnut (not shown) disposed in the tailgate 12 when the center wall is in its folded orientation. Turning the hold down element 119 allows the user to quickly lock the center wall 102 in a folded position.

Figure 18:
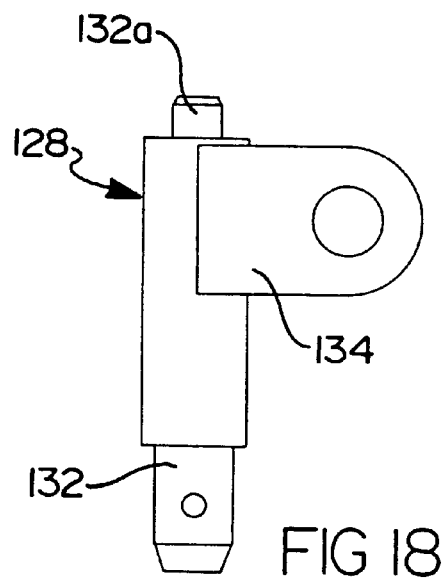
FIG. 18 is a side view of the quick release mounting assembly secured to each of the uprights.

A lower end of each upright 106 includes a slot 122 and a through aperture 124. A pivot pin 126 is used to secure the lower end to a quick release mounting assembly 128, shown in FIG. 18, which is in turn fixedly secured to the tailgate 12 of the vehicle 16. A camming surface 130, as best shown in FIGS. 10 and 11, makes contact with a spring biased latching pin 132 captively retained in a housing 134 (FIG. 18) of the mounting assembly 128 when the center wall 102 is pivoted in the direction of arrow 136. This pivoting motion depresses a plunger 132*a* of the latching pin 132 which allows the latching pin 132 to be disengaged from one of a first pair of mounting elements 133 fixedly secured to the inside surface of the tailgate 12. One of the mounting elements 133 is shown in FIGS. 22–25 and includes a central opening 133*a* for receiving the latching pin 132 and a pair of holes 133*b* for allowing conventional fastening elements to be used to secure the mounting element 133 to the tailgate 12. A shoulder portion 133*c* engages a portion of the latching pin 132 to maintain the latching pin 132 secured thereto.

Referring further to FIGS. 7–9, the end walls 104 also each include an end post 140. Each end post 140 is secured to an outermost end of one of the end wall support members 112, and each includes a plurality of recesses 141 for accepting the outermost end portions of the support members 112. Pins, threaded screws or even adhesives can be used to secure the outermost ends of the support members 112 within their respective recesses 141.

Each end post 140 further includes a locking mechanism 142 for securing its associated end wall 104 to one of a pair of second mounting elements 154, which are in turn secured to an inside surface 36*a* of the sidewall 36 of the bed 14. The locking mechanism 142 includes a housing 146 which has a captively held, spring biased latching pin 148, also shown in FIG. 12, secured thereto. The locking mechanisms 142 allow the end walls 104 to be quickly and easily secured to the sidewalls 36.

Referring now to FIGS. 13–16, one of the second pair of mounting elements 154 is illustrated. The mounting element 154 is secured to a frame member disposed within the sidewall 36*a* by a pair of conventional fastening elements which extend through openings 156. Central opening 158 has an internal shoulder portion 160 (FIG. 14) which engages the latching pin 132 to maintain it secured thereto.

Figure 12:
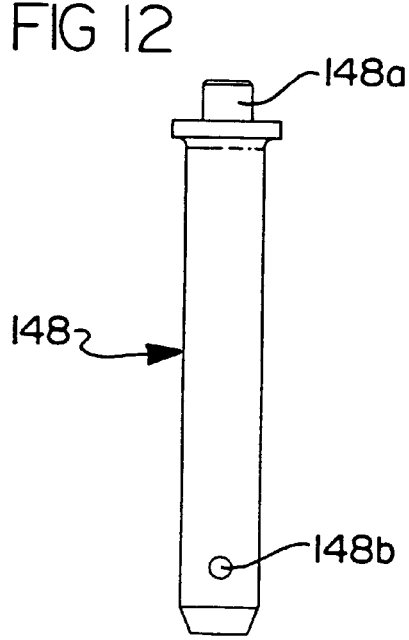
FIG. 12 is a side view of the locking pin used with the bed extender of the present invention.

Latching pins 132 and 148 are identical in construction, and thus only one will be described. Referring to FIG. 12, latching pin 148 is known in the industry as a "positive lock pin". This component is commercially available from Pivot Point, Inc. of Hustisford, Wis. The plunger 148a of latching pin 148 includes ball bearings 148b spring biased by an internally mounted spring (not shown). The ball bearings 148b engage with the internal shoulder 160 of the mounting element 164 (shown in FIG. 14) to maintain the uprights 106 secured to the mounting elements 154. Pushing on the plunger 132a allows ball bearings 148b to be retracted so that the latching pin 148 can be removed from the mounting element 154. With the support columns 106 and locking mechanisms 142 unlatched from their respective securing structures the assembly comprising the center wall 102 and end walls 104 can be removed. A principal advantage of the bed extender 100 is that once detached, it can be rotated 180 degrees and reattached so as to open rearwardly. This is shown in simplified form in the plan view of FIG. 17. The quick release mounting assembly of each upright 106 is attached to a respective one of a third pair of mounting elements 155 mounted within a floor 14a of the bed 14. Mounting elements 155 are spaced apart such that the uprights 106 can be directly secured thereto. Mounting elements 155 are identical in construction to mounting elements 154. The locking mechanisms 142 are secured to their respective mounting elements 154 to hold the end walls 104 to the vehicle's sidewalls 36.

When positioned to open rearwardly as shown in FIG. 17, the bed extender 100 can function as a cargo restraining device to restrain small and medium sized items of cargo therewith. The tailgate 12 is positioned in its closed position and thus forms one wall which cooperates with the bed extender 100 in defining the area within which cargo can be placed. In this orientation, the bed extender 100 prevents small and medium sized cargo items from moving around within the bed 14 when the vehicle 16 is in motion.

Figure 19:
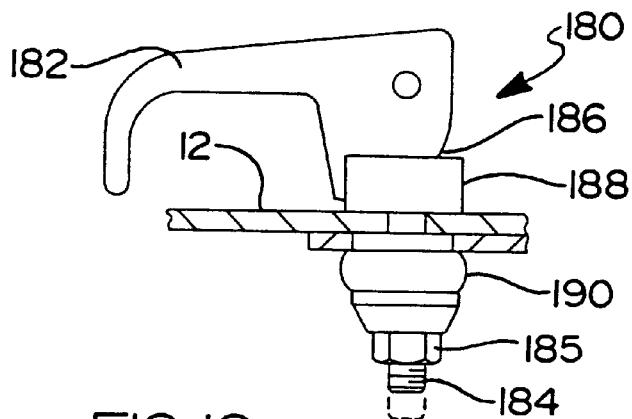
FIG. 19 is a side view of a quick release clamping assembly used to secure the bed extender in a folded position.
Figure 13:
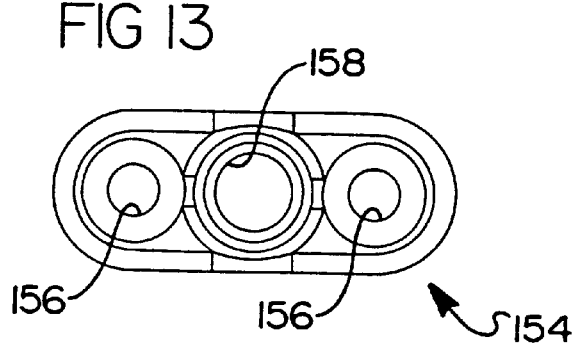
FIGS. 13–16 are views of the mounting element.
Figure 14:
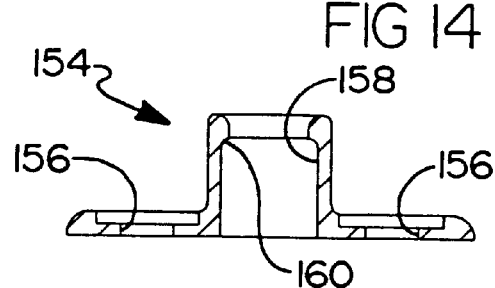
Figure 15:
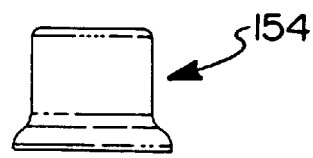
Figure 16:
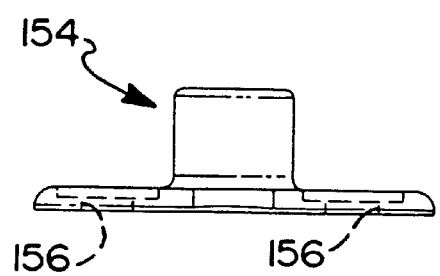
Figure 22:
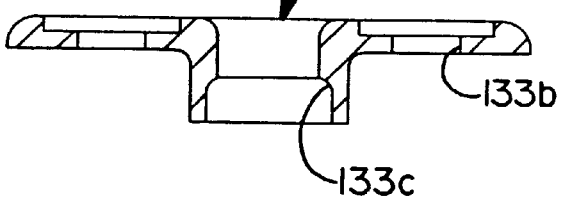
FIGS. 22–25 illustrate the first mounting element.
Figure 23:
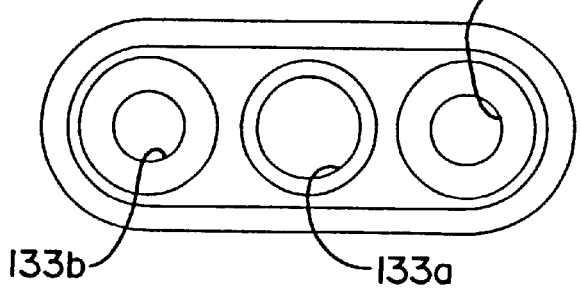
Figure 24:
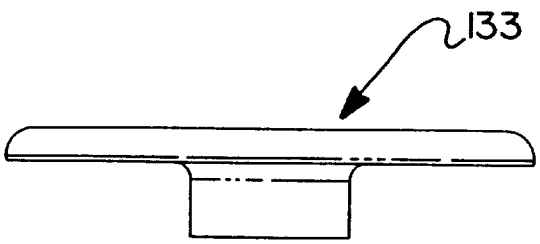
Figure 25:
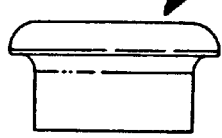

With either of the embodiments 10 or 100 of the bed extender, a quick release clamping assembly 180, shown in FIG. 19, can be incorporated with the center wall 18 or 102 to clamp the center wall to an inside surface 12a of the tailgate 12 when the bed extender 100 is in its folded orientation. This clamping assembly 180 is commercially available from Southco, Inc. of Concordville, Pa. The clamping assembly includes a lever 182 which is pivotally attached to a threaded shaft 184. The lever includes a camming surface 186. A washer 188 and a bushing 190 are both disposed over the shaft 184. A nut 185 secures the washer 188 and bushing 190 to the shaft 184.

The clamping assembly 180 is secured to a central area of the center wall 102. A hole is formed on an inside surface of the tailgate 12 at the point of contact of the shaft 184 when the center wall 102 is folded down onto the tailgate 12. The bushing 190 extends down into the hole. When the lever 182 is urged into the position shown in FIG. 19, the bushing 190 is compressed, causing it to bulge outward. The bulging portion is disposed within the hole, which maintains the assembly 180 secured to the tailgate 12.

The bed extender 100 is shown in its folded orientation in FIGS. 20 and 21. Recesses 140a in the end posts 140 allow them to be folded down over the middle support 110. In this manner the bed extender 100 forms a very compact assembly that does not interfere with the area of the bed 14a when not in use.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A bed extender apparatus for enlarging the effective cargo area of a bed of a pickup truck, wherein said bed has a pair of sidewalls and a tailgate associated therewith, the bed extender apparatus comprising:

a center wall having a length sufficient to extend along a major portion of said tailgate of said pickup truck;

a pair of endwalls pivotally secured to said center wall at opposite longitudinal ends of said center wall;

at least one first mounting element fixedly secured to an inner wall of said tailgate;

at least one second mounting element secured to at least one of said sidewalls of said bed of said pickup truck;

at least one mounting assembly forming a portion of said center wall for pivotally and detachably supporting said center wall to said first mounting element;

at least one locking mechanism associated with at least one of said endwalls for engaging said second mounting element to secure said endwalls to said sidewalls of said pickup truck bed;

at least one third mounting element disposed within said bed forwardly of said first and second mounting elements; and wherein said center wall and said endwalls can be detached from said first and second mounting elements, respectively, reoriented 180 degrees and resecured within said bed with said center wall detachably engaging said third mounting element and said locking mechanism of said at least one of said endwalls detachably engaging said second mounting element, to thereby perform a cargo restraining function.

2. The bed extender of claim 1, wherein said center wall includes a pair of uprights defining opposite longitudinal ends of said center wall, and wherein at least one of said uprights is pivotally secured to said mounting assembly.

3. The bed extender of claim 1, wherein said mounting assembly comprises:

a latching pin assembly; and wherein said mounting assembly is pivotally secured to a portion of said center wall such that pivotal movement of said center wall serves to actuate said latching pin assembly, thereby causing said latching pin assembly to be released from said first mounting element.

4. The bed extender of claim 1, wherein said center wall is pivotally supported by said mounting assembly, said mounting assembly being releasably secured to said first mounting element;

wherein said center wall can be folded down generally flush against said interior wall of said tailgate; and wherein said center wall includes a hold down assembly for securing said center wall in a folded orientation.

5. The bed extender of claim 1, wherein each of said end walls includes an end post; and wherein said center wall includes a support member extending longitudinally between opposite ends of said center wall; and each said end post includes a recess positioned to receive said support member therein when said end walls are pivoted toward said center wall.

6. A cargo bed extender for use with a vehicle having a cargo supporting bed, said bed extender comprising:

a center wall;

a pair of end walls mounted pivotally to opposite longitudinal ends of said center wall;

at least one first mounting element disposed on an inside surface of a tailgate associated with said cargo supporting bed;

at least one mounting assembly for pivotally and releasably securing said center wall to said inside surface of said tailgate;

a pair of second mounting elements disposed on each of a pair of interior wall portions of said cargo supporting bed;

a pair of locking assemblies for releasably engaging said second mounting elements for securing said end walls to respective ones of said interior wall portions of said cargo supporting bed;

said end walls being foldable generally flush with said center wall when said locking assemblies are not secured to said interior wall portions of said cargo supporting bed, and said center wall being foldable, together with said endwalls, towards, and generally flush against, said inside surface of said tailgate when said bed extender is not required for use;

at least one third mounting element disposed within a floor of said cargo supporting bed forwardly of said first and second mounting elements; and wherein said center wall and said endwalls can be completely detached from said first mounting elements and said second mounting elements, respectively, and reoriented 180 degrees such that said at least one mounting assembly Is releasably attached to said third mounting element and said locking assemblies are releasably engaged with said second mounting elements, thus enabling said center wall and said endwalls to be used as a cargo restraining implement within said cargo supporting bed of said vehicle.

7. The bed extender of claim 6, wherein said center wall comprises a hold down assembly; and wherein said inside surface of said tailgate comprises securing structure for engaging with said hold down assembly so that said center wall can be secured in a folded orientation against said inside surface of said tailgate when said bed extender is not in use.

8. The bed extender of claim 6, wherein said end walls each include an end post; and wherein each said end post includes a recess adapted to receive a portion of said center wall when said end posts are folded against said center wall, to thereby place said bed extender into a compact, folded orientation.

9. The bed extender of claim 6, wherein said center wall includes a plurality of longitudinal members;

wherein said end walls each include a plurality of end wall support members; and wherein said end wall support members reside inbetween said support members of said center wall when said end walls are folded onto said center wall, thereby forming a compact assembly when said bed extender is not in use.

10. The bed extender of claim 6, wherein said locking assemblies each include a latching pin assembly having a manually engageable plunger for releasing said latching pin assembly from its associated said second mounting element.

11. The bed extender of claim 6, wherein said center wall includes a pair of uprights at opposite longitudinal ends thereof;

a pair of said first mounting elements;

wherein lower end portions of said uprights include a pair of slots; and wherein said lower end portions are pivotally secured to a pair of said mounting assemblies.

12. The bed extender of claim 11, wherein said mounting assemblies each include a latching pin having a spring biased plunger for releasing said latching pin from its associated said first mounting element; and wherein tilting movement of said center wall causes said plungers to be depressed, thereby releasing said mounting assemblies from their respective said first mounting elements.

13. A bed extender for a bed of a vehicle having a cargo supporting bed including a tailgate, said bed extender comprising;

a center wall having a pair of uprights and a plurality of supports extending longitudinally between said uprights;

a pair of mounting assemblies disposed at lower ends of each of said uprights;

a first pair of mounting elements secured to an inside wall surface of a tailgate of said vehicle for releasably securing said mounting assemblies thereto and for permitting pivotal movement of said center wall into a position parallel to said inside wall surface of said tailgate;

a pair of end walls pivotally secured to said uprights;

a pair of looking assemblies associated with said end walls;

a second pair of mounting elements secured to inner walls of said supporting bed of said vehicle for releasably engaging said locking assemblies;

a third pair of Mounting elements disposed in a floor of said bed of said vehicle forwardly of said first and second pairs of mounting elements;

wherein said mounting assemblies are releasably secured to said third pair of mounting elements and said locking assemblies are secured to said second pair of mounting elements when said center wall and said end walls are oriented so as to open rearwardly toward said tailgate, to thereby perform a cargo restraining function within said cargo supporting bed of said vehicle.

14. The bed extender of claim 13, further comprising a hold down assembly associated with said center wall for securing said center wall in a folded orientation against said inside wall surface of said tailgate.

15. A bed extender apparatus for enlarging the effective cargo area of a bed of a pick-up truck, wherein said bed has a pair of sidewalls and a tailgate associated therewith; comprising;

a center wall having a length sufficient to extend along a major portion of said tailgate of said pick-up truck;

a pair of endwalls pivotally secured to said center wall and opposite longitudinal ends of said center wall;

at least one first mounting element fixedly secured to an inner wall of said tailgate;

at least one second mounting element secured to at least one of said sidewalls of said bed of said pick-up truck;

at least one mounting assembly forming a portion of said center wall for pivotally and detachably supporting said center wall to said first mounting element;

at least one locking mechanism associated with at least one of said endwalls for engaging said second mounting element to secure said endwalls to said sidewall of said pick-up truck bed; and wherein said center wall and said endwalls are detachable from said first and second mounting elements, respectively, and able to be reoriented 180 degrees and resecured within said bed with said looking mechanisms of said endwalls detachably engaging said second mounting elements to thereby perform a cargo restraining function.

* * * * *